(12) United States Patent
Adachi

(10) Patent No.: US 11,635,834 B2
(45) Date of Patent: Apr. 25, 2023

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 227 days.

(21) Appl. No.: 17/242,889

(22) Filed: Apr. 28, 2021

(65) Prior Publication Data

US 2021/0349563 A1    Nov. 11, 2021

(30) Foreign Application Priority Data

May 8, 2020    (JP) .............................. JP2020-082421

(51) Int. Cl.
  *G06F 3/041*     (2006.01)
  *G06F 3/044*     (2006.01)
  *G02F 1/1362*    (2006.01)

(52) U.S. Cl.
  CPC ...... *G06F 3/0412* (2013.01); *G02F 1/136286* (2013.01); *G06F 3/0443* (2019.05)

(58) Field of Classification Search
  CPC . G06F 3/0142; G06F 3/0443; G02F 1/136286
  See application file for complete search history.

(56) References Cited

U.S. PATENT DOCUMENTS

| 2017/0010708 A1* | 1/2017 | Lee ...................... G06F 3/0443 |
| 2019/0243173 A1* | 8/2019 | Shiina ................. G06F 3/04164 |
| 2020/0174611 A1* | 6/2020 | Aoki ..................... G06F 3/0448 |

FOREIGN PATENT DOCUMENTS

| CN | 103392198 A | * | 11/2013 | ......... G02F 1/13338 |
| CN | 105045442 A | * | 11/2015 | ........... G06F 3/0412 |
| JP | H06-112617 A | | 4/1994 | |
| JP | 2002-131766 A | | 5/2002 | |
| JP | 2016208020 A | * | 12/2016 | ......... H01L 27/3276 |
| WO | WO-2010016174 A1 | * | 2/2010 | ............. G06F 3/044 |

* cited by examiner

*Primary Examiner* — Ricardo Osorio
(74) *Attorney, Agent, or Firm* — K&L Gates LLP

(57) ABSTRACT

The display device includes a substrate, a pixel, an image-signal line, a counter substrate over the pixel and the image-signal line, a touch-detecting electrode, and a first terminal portion. The pixel is located over the array substrate and includes a pixel electrode, a common electrode, and a liquid crystal layer. The image-signal line is located over the substrate and is electrically connected to the pixel. The touch-detecting electrode is located over the counter substrate and extends in a direction intersecting with a direction in which the common electrode extends. The first terminal portion is electrically connected to the touch-detecting electrode. The first terminal portion is spaced from a first edge of the counter substrate intersecting with the image-signal line. A plane shape of the first terminal portion in a plane parallel to a surface of the counter substrate has at least one first curved portion facing the first edge.

17 Claims, 14 Drawing Sheets

DISPLAY DEVICE

CROSS REFERENCE TO RELATED APPLICATIONS

This application is based on and claims the benefit of priority from the prior Japanese Patent Application No. 2020-082421, filed on May 8, 2020, the entire contents of which are incorporated herein by reference.

BACKGROUND OF THE INVENTION

Field

An embodiment of the present invention relates to a display device. For instance, an embodiment of the present invention relates to a display device including a touch sensor.

Description of the Related Art

As an example of a flat panel display device, a liquid crystal display device and an organic electroluminescent display device are represented. These display devices are each a structural member in which a plurality of thin films including a variety of materials such as an insulator, a semiconductor, and a conductor is stacked, and a function as a display device is realized by appropriately patterning these thin films. Hence, manufacturing a display device requires a great number of processes such as a washing process, a film-formation process, a light-exposure process, a development process, an etching process, an ashing process, an inspection process, and the like which affords many opportunities for electrostatic breakdown caused by charge of a substrate. For example, in Japanese Patent Application Publications H6-112617 and 2002-131766, a structure is disclosed for preventing discharge caused by static electricity between terminals for inputting electric signals to a display device.

BRIEF SUMMARY OF THE INVENTION

An embodiment of the present invention is a display device. The display device includes an array substrate, a pixel, an image-signal line, a counter substrate, a touch-detecting electrode, and a first terminal portion. The pixel is located over the array substrate and includes a pixel electrode, a common electrode, and a liquid crystal layer. The image-signal line is located over the array substrate and is electrically connected to the pixel. The counter substrate is located over the pixel and the image-signal line. The touch-detecting electrode is located over the counter substrate and extends in a direction intersecting a direction in which the common electrode extends. The first terminal portion is electrically connected to the touch-detecting electrode. The first terminal portion is spaced away from a first edge of the counter substrate intersecting the image-signal line. A plane shape of the first terminal portion in a plane parallel to a main surface of the counter substrate has at least one first curved portion facing the first edge.

An embodiment of the present invention is a display device. The display device includes an array substrate, a pixel, an image-signal line, a resin layer, a first touch-detecting electrode, a second touch-detecting electrode, and a lead wiring. The pixel is located over the array substrate and includes a pixel electrode and a common electrode. The image-signal line is located over the array substrate and is electrically connected to the pixel. The resin layer is located over the pixel and the image-signal line, and the first touch-detecting electrode is located over the resin layer. The second touch-detecting electrode is located over the resin layer and intersects the first touch-detecting electrode. The lead wiring has a first terminal portion electrically connected to one of the first touch-detecting electrode and the second touch-detecting electrode. The first terminal portion is spaced away from an edge of the resin layer intersecting the image-signal line. A plane shape of the first terminal portion in a plane parallel to a main surface of the resin layer has at least one first curved portion.

An embodiment of the present invention is a detection device. The detection device is stacked over a display device. The display device includes: a plurality of pixel electrodes in a display region; a common electrode opposing the plurality of pixel electrodes; a terminal portion in a frame region surrounding the display region; and a plurality of wirings located in the frame region or continuously located in both of the frame region and the display region, the plurality of wirings connecting the plurality of pixel electrodes or the common electrode to the terminal portion. The detection device includes a plurality of touch-detecting electrodes opposing the display region and a first terminal portion opposing the wirings and electrically connected to the touch-detecting electrode. A plane shape of the first terminal portion has at least one first curved portion at a corner opposing the wiring.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure.

When a plurality of films is formed by processing one film, the plurality of films may have functions or roles different from each other. However, the plurality of films originates from a film formed as the same layer in the same process and has the same layer structure and the same material. Therefore, the plurality of films is defined as films existing in the same layer.

Hereinafter, a display device 100 according to an embodiment of the present invention is explained.

1. Outline Structure

Figure 1:
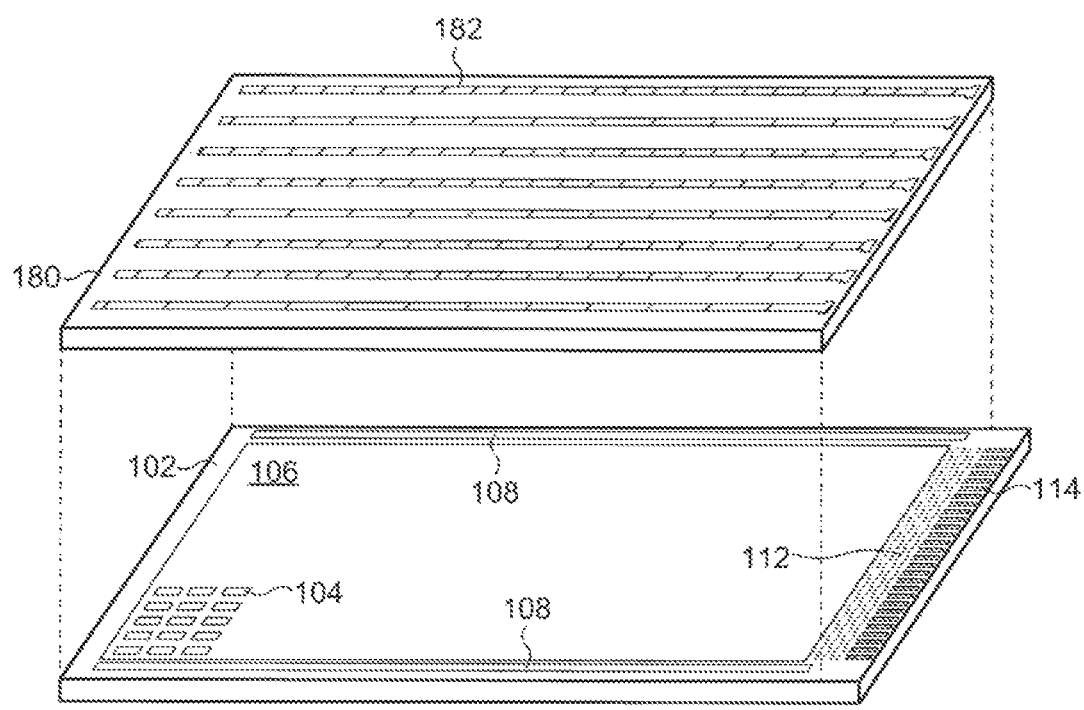
FIG. 1 is a schematic developed view of a display device according to an embodiment of the present invention.

A schematic developed view of the display device 100 is shown in FIG. 1. The display device 100 has an array substrate 102 and a counter substrate 180 disposed so as to oppose the array substrate 102. A variety of patterned insulating films, conductive films, and semiconductor films is appropriately arranged between the array substrate 102 and the counter substrate 180, and a plurality of pixels 104, gate-line driver circuits 108 for driving the pixels 104, wirings 112, and terminals 114 are formed with these films. Each pixel 104 has a liquid crystal element, and the display device 100 functions as a liquid crystal display device. The pixels 104, the gate-line driver circuits 108, and the wirings 112 are sandwiched by the array substrate 102 and the counter substrate 180.

The display device 100 further includes, over the counter substrate, a plurality of touch-detecting electrodes 182 which forms a touch sensor. A liquid crystal layer and orientation films which are not illustrated in FIG. 1 are provided between the array substrate 102 and the counter substrate 180, and the array substrate 102 and the counter substrate 180 are fixed to each other with a sealing material (described to below). Hereinafter, these structural elements are explained in detail.

2. Array Substrate

Figure 2:
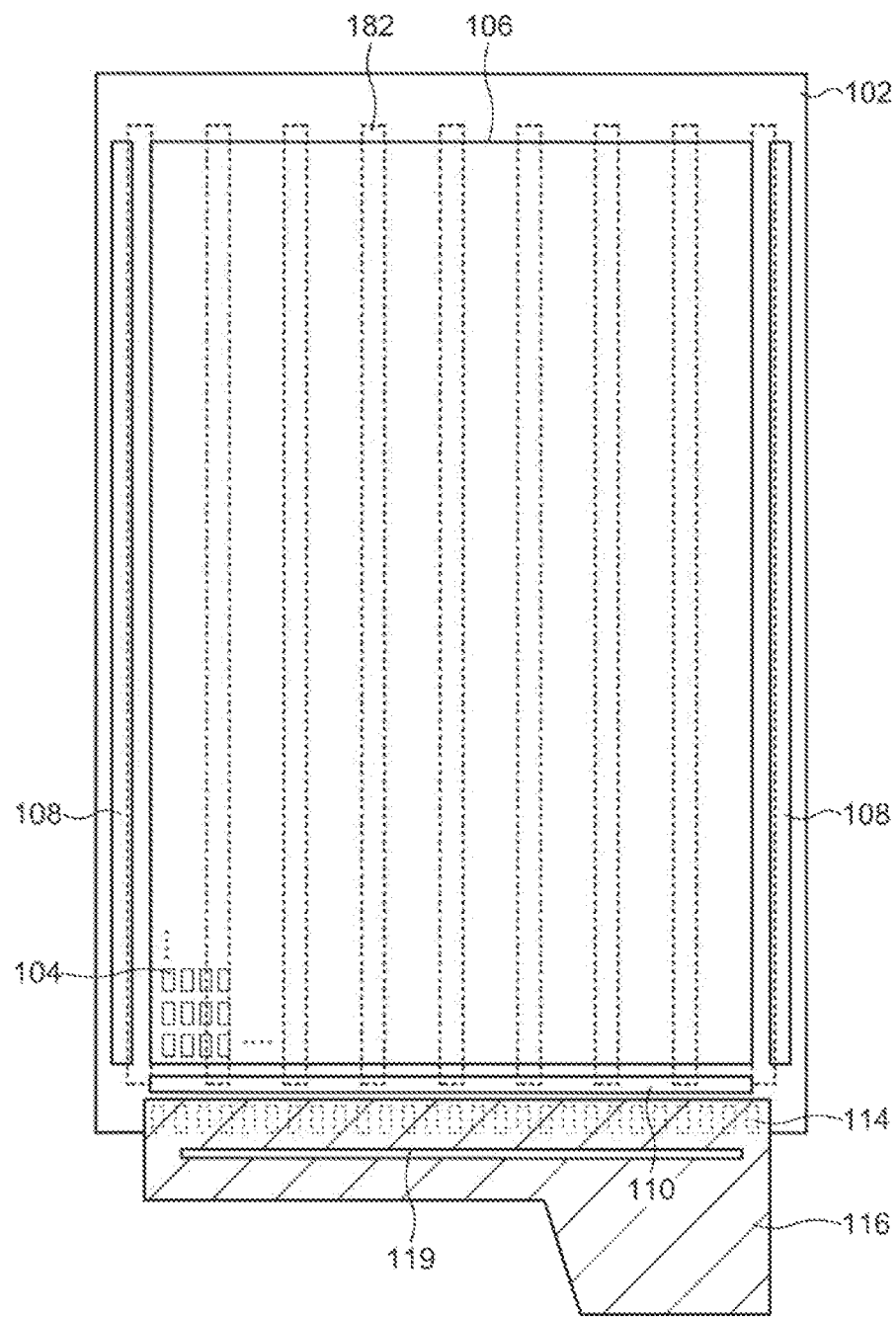
FIG. 2 is a schematic top view of an array substrate of a display device according to an embodiment of the present invention.

FIG. 2 is a schematic top view of the array substrate 102. In FIG. 2, the touch-detecting electrodes 182 over the counter substrate 180 are also illustrated in order to show a positional relationship with the touch-detecting electrodes 182.

The array substrate 102 is configured to transmit visible light and is a substrate including glass, quartz, or a polymer such as a polyimide and a polycarbonate. It is possible to provide flexibility to the display device 100 by forming the array substrate 102 so as to have flexibility, by which a so-called flexible display can be structured.

The pixel 104 is a minimum unit providing single color information and includes, as a fundamental structure, a pixel circuit and the liquid crystal layer 162 overlapping with the pixel circuit as described below. There is no limitation to an arrangement of the plurality of pixels 104, and the plurality of pixels 104 may be arranged in a variety of arrangements such as a stripe arrangement, a mosaic arrangement, and a delta arrangement, for example. A single region surrounding the plurality of pixels 104 and the regions between the pixels 104 is a display region 106.

The gate-line driver circuits 108 are electrically connected to each pixel 104 and supply a variety of signals such as a gate signal to each pixel 104. The number of the gate-line driver circuits 108 is not limited. As depicted in FIG. 2, two gate-line driver circuits 108 may be disposed so as to sandwich the display region 106, or a single number of gate-line driver circuits 108 may be arranged. The display device 100 may further have a signal-line driver circuit 110 over the array substrate 102. In this case, the signal-line driver circuit 110 is arranged between the terminals 114 and the display region 106.

The wirings 112 extend from the pixels 104 and the gate-line driver circuits 108 to an edge of the array substrate 102 (see FIG. 1) and are connected to the terminals 114 at an edge portion of the array substrate 102. The terminals 114 are configured to be electrically connected to a connector 116 such as a flexible printed circuit substrate (FPC). A driver IC 119 having an integrated circuit formed over a semiconductor substrate may be arranged over the connector 116. A variety of signals and a power source are supplied from an external circuit through the connector 116, and the driver IC 119 generates signals such as an image signal and an initializing signal on the basis of these signals and the power source and supplies the signals to the gate-line driver circuits 108 and the signal-line driver circuit 110. The gate-line driver circuits 108 and the signal-line driver circuit 110 control the pixels 104 on the basis of the signals generated by the driver IC 119, by which an image can be displayed on the display region 106.

Figure 3:
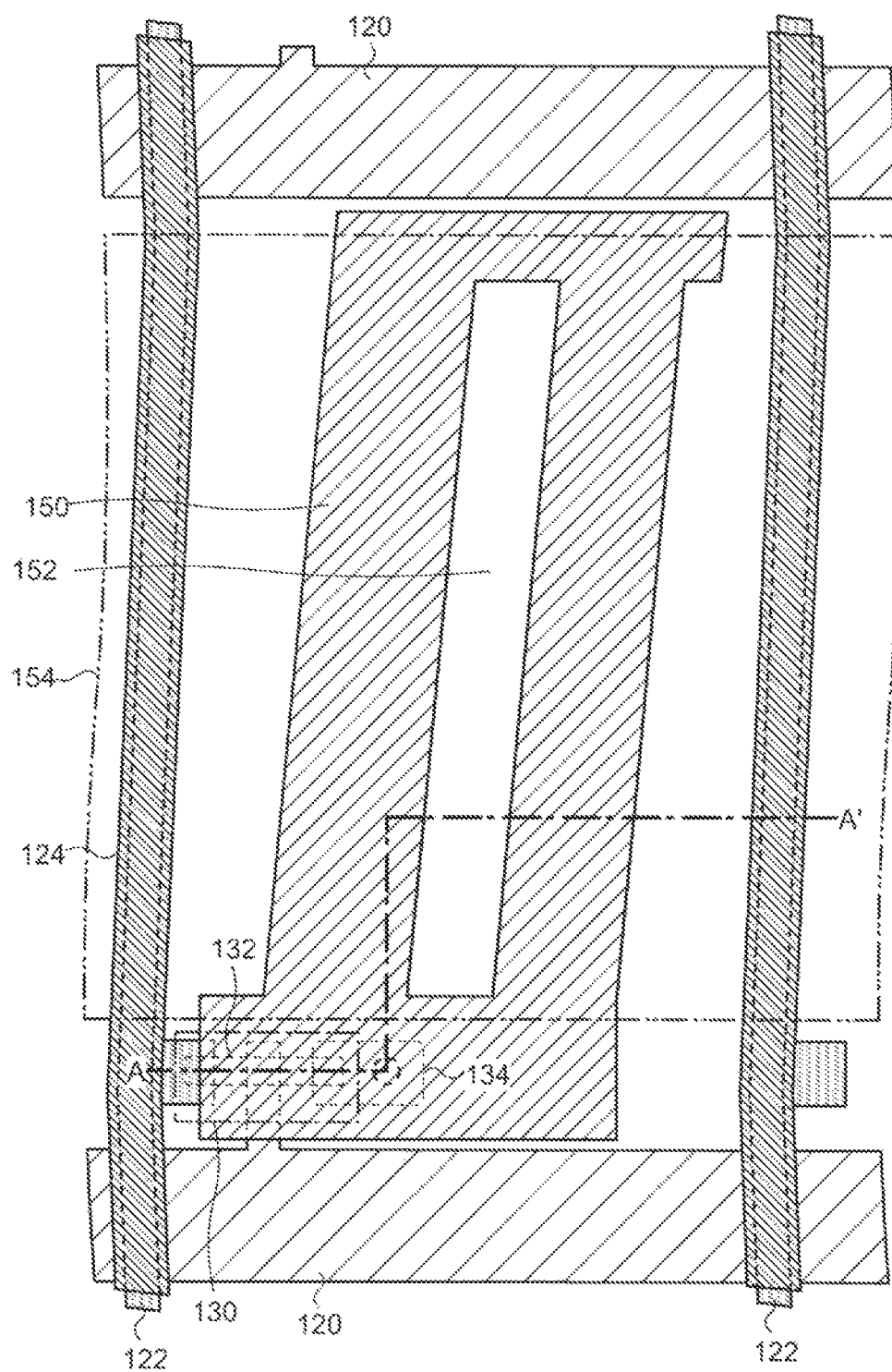
FIG. 3 is a schematic top view of a pixel of a display device according to an embodiment of the present invention.
Figure 4:
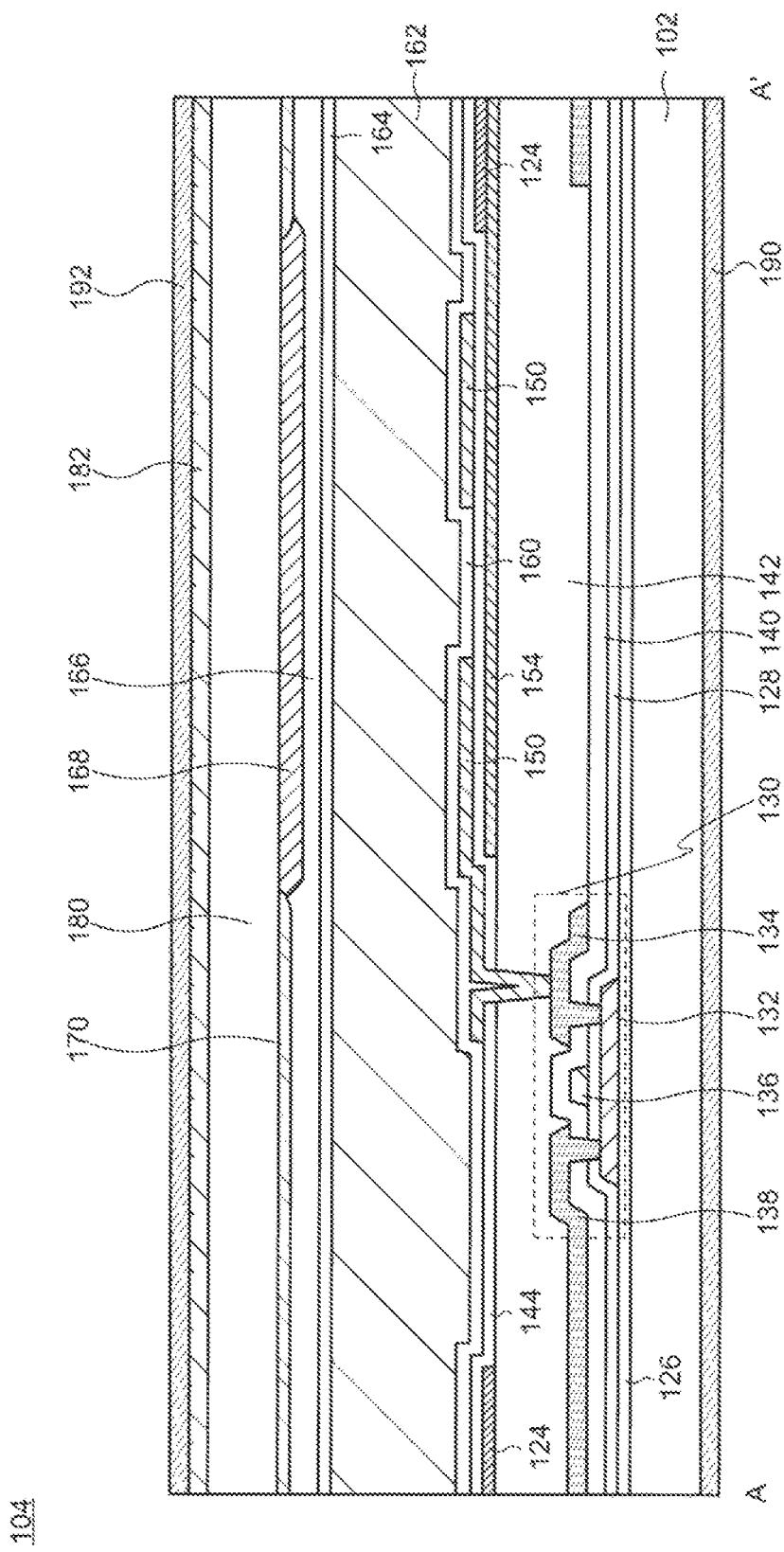
FIG. 4 is a schematic cross-sectional view of a pixel of a display device according to an embodiment of the present invention.

An example of the pixel circuit included in the pixel 104 is shown in FIG. 3 and FIG. 4. FIG. 3 is a schematic top view, and FIG. 4 is a schematic view of a cross section along a chain line A-A'. As shown in FIG. 3, a plurality of gate-signal lines 120 and a plurality of image-signal lines 122 are formed in the display region 106. Each of the plurality of gate-signal lines 120 controls the plurality of pixels 104 arranged in a direction in which the gate-signal line 120 extends. In a similar way, each of the image-signal lines 122 is electrically connected to the plurality of pixels 104 arranged in a direction in which the image-signal line 122 extends. Note that the image signal lines 122 are electrically connected to the wirings 112 (FIG. 1). Alternatively, the image-signal lines 122 may extend to the outside of the display region 106 and function as the wirings 112. Hence, the wirings 112 may be recognized as the image-signal lines 122.

A transistor 130 is disposed in each pixel 104. The transistor 130 includes a portion of the gate-signal line 120 (a portion protruding upward in the drawing), a semiconductor film 132, a source electrode 134, and a portion of the image-signal line 122 (a portion protruding rightward in the drawing). The portion of the gate-signal line 120 functions as a gate electrode 136 of the transistor 130, whereas the portion of the image-signal line 122 functions as a drain electrode 138 of the transistor 130. Note that, the names source electrode 134 and drain electrode 138 of the transistor 130 may be interchanged with each other depending on the current direction and the polarity of the transistor 130. Although not illustrated, the pixel 104 may further have a capacitor element and another semiconductor element such as a transistor.

The pixel 104 further includes a common electrode 154 and a pixel electrode 150. The fundamental structure of the liquid crystal element is provided by the common electrode 154, the pixel electrode 150, and the liquid crystal layer 162. The pixel electrode 150 may have a slit 152. Although the slit 152 shown in FIG. 3 has a closed shape, the slit 152 may have an opened shape. Alternatively, the pixel electrode 150 may have both the slit 152 with a closed shape and a slit with an opened shape. The pixel electrode 150 is electrically connected to the transistor 130. The image-signal line 122 is supplied with a signal corresponding to an image through the signal-line driver circuit 110 or the driver IC 119, which is applied to the pixel electrode 150 through the transistor 130.

The common electrodes 154 are arranged in a stripe shape along the direction in which the gate signal lines 120 extend and are each shared by the plurality of pixels 104. The common electrode 154 is applied with a fixed potential in a period when an image is displayed and functions as an electrode for applying a voltage to the liquid crystal layer 162. On the other hand, the common electrode 154 is supplied with an alternating voltage (a pulse voltage) in a period when no image is displayed and functions as one of the electrodes of the touch sensor (touch-detecting electrode) as described below. Note that, although an example is demonstrated in FIG. 3 where the common electrode 154 is arranged parallel to the gate-signal line 120, the common electrode 154 may be arranged parallel to the image-signal line 122.

As an optional structure, the pixel 104 may have an auxiliary wiring 124 electrically connected to the common electrode 154. The auxiliary wiring 124 may extend in the direction in which the image-signal line 122 extends and may be shared by the plurality of pixels 104. When the pixel electrode 154 includes a conductive oxide transmitting visible light, such as indium-tin oxide (ITO) and indium-zinc oxide (IZO), a voltage drop readily occurs since these oxides have a higher resistance compared with a metal such as aluminum, copper, tungsten, titanium, and molybdenum. In addition, the common electrodes 154 are divided into a plurality of portions and are utilized as the touch-detecting electrodes as described below. In this case, each portion has a small area, which readily causes a voltage drop in the common electrodes 154. Hence, a large difference in voltage applied to the common electrodes 154 may arise between the pixels 104. However, the formation of the auxiliary wiring 124 including a metal so as to be in contact with the common electrode 154 compensates for the low conductivity of ITO or IZO, by which the voltage drop can be prevented or suppressed. The auxiliary wiring 124 may be disposed over or under the common electrode 154.

Figure 5:
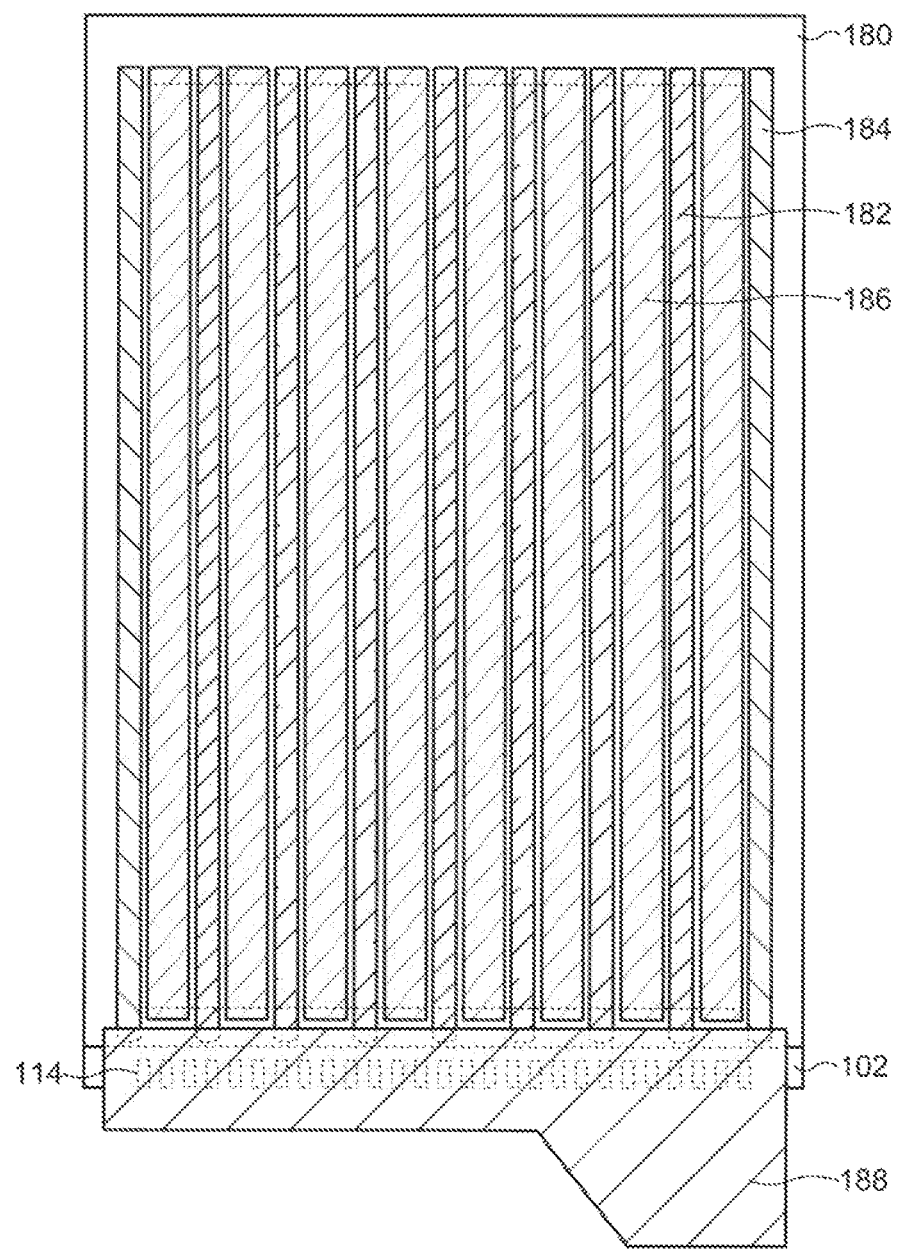
FIG. 5 is a schematic top view of a counter substrate of a display device according to an embodiment of the present invention.

As depicted in FIG. 4, the display device 100 includes a variety of patterned films, and the pixels 104 are structured by these films. Specifically, the transistor 130 is provided over the array substrate 102 through an undercoat 126 which is an optional element. The transistor 130 is structured by the gate electrode 136, a gate insulating film 128, the semiconductor film 132, an interlayer insulating film 140, the source electrode 134, and the drain electrode 138 and functions as a switch to supply the initializing signal and the image signal. Although the transistor 130 shown in FIG. 5 is a top-gate type transistor, there is no limitation to the structure of the transistor 130. The transistor 130 may be a bottom-gate type transistor or may have a structure having gate electrodes over and under the semiconductor film 132. In addition, there is no limitation to a vertical relationship between the semiconductor film 132 and the source electrode 134 and between the semiconductor film 132 and the drain electrode 138.

A leveling film 142 is formed over the transistor 130, by which depressions and projections caused by the transistor 130 are absorbed to provide a flat surface on the leveling film 142. The common electrode 154 is disposed over the leveling film 142. When the auxiliary wiring 124 is formed, the auxiliary wiring 124 is formed over or under the common electrode 154 so as to be in contact with the common electrode 154.

Each pixel 104 further includes an interelectrode insulating film 144 covering the common electrode 154 and the leveling film 142. The interelectrode insulating film 144 has a function to electrically insulate the common electrode 154 and the pixel electrode 150. The pixel electrode 150 is disposed over the leveling film 142 and the interelectrode insulating film 144 and is electrically connected to the source electrode 134 in an opening portion formed in the leveling film 142 and the interelectrode insulating film 144. A first orientation film 160 is further provided over the pixel electrode 150 over which the liquid crystal layer 162 is arranged. A potential difference provided between the common electrode 154 and the pixel electrode 150 results in an electric field substantially parallel to a top surface of the array substrate 102 in the liquid crystal layer 162. Liquid crystal molecules in the liquid crystal layer 162 are rotated by this electric field, which causes rotation of a polarization plane of polarized light passing through the liquid crystal layer 162. Hence, the display device 100 functions as an FFS (Fringe Field Switching) liquid crystal display device which is a type of the so-called IPS (In-Plane Switching) liquid crystal display devices. Note that the display device 100 is not limited to an IPS liquid crystal display device and may be a TN (Twisted Nematic) liquid crystal display device or a VA (Vertical Alignment) liquid crystal display device.

The counter substrate 180 is disposed over the first orientation film 160 through the liquid crystal layer 162. The counter substrate 180 may be provided with a light-shielding film (black matrix) 170, a color filter 168, overcoat 166 covering the light-shielding film 170 and the color filter 168, and the like.

The light-shielding film 170 has a function to shield visible light and may be disposed so as to overlap with the gate-signal lines 120 and the image-signal lines 122. The light-shielding film 170 may be arranged so as to overlap with the transistors 130. As can be understood from FIG. 3, when the light-shielding film 170 is provided so as to overlap with the gate-signal lines 120 and the image-signal lines 122, the light-shielding film 170 can be recognized as a single film having opening portions. Hence, the opening portions of the light-shielding film 170 respectively correspond to the display regions of the pixels 104.

The color filter 168 is disposed in order to provide color to the light extracted from each pixel 104 and overlaps with the opening portions of the light-shielding film 170. Thus, the color filter 168 may be arranged so as to overlap with the pixel electrodes 150 and the common electrodes 154.

The counter substrate 180 further includes a second orientation film 164 provided so as to be in contact with the liquid crystal layer 162. Similar to the first orientation film 160, the second orientation film 164 has a function to orient the liquid crystal molecules. Although not illustrated, a spacer may be added into the liquid crystal layer 162 in order to maintain a gap between the array substrate 102 and the counter substrate 180. Alternatively, the spacer may be formed over the counter substrate 180 so as to be positioned between the adjacent pixels 104.

The display device 100 further has a first polarizing plate 190 and a second polarizing plate 192 under the array substrate 102 and over the touch-detecting electrode 182, respectively. A backlight which is not illustrated may be arranged under the first polarizing plate 190. The light irradiated from the backlight becomes linearly polarized light when passing through the first polarizing plate 190. The polarization plane of this linearly polarized light is rotated by the liquid crystal layer 162 when passing through the liquid crystal layer 162. The light is then partially absorbed by the color filter 168 to be colorized, passes through the second polarizing plate 192, and is extracted outside.

3. Counter Substrate 3-1. Structure

A schematic top view of the counter substrate 180 is shown in FIG. 5. Similar to the array substrate 102, the counter substrate 180 is also configured to transmit visible light and is a substrate including glass, quartz, or a polymer such as a polyimide and a polycarbonate. As illustrated in FIG. 5, a portion of the array substrate 102 and the terminals 114 formed thereover do not overlap with the counter substrate 180 and are exposed from the counter substrate 180. Hence, at least one edge (a lower edge in the example of FIG. 5) of the counter substrate 180 overlaps with the array substrate 102 and intersects with the wirings 112 or the image-signal lines 122 functioning as the wirings 112 formed over the array substrate 102.

The plurality of touch-detecting electrodes 182 arranged in a stripe shape is disposed over the counter substrate 180. As depicted in FIG. 5, each touch-detecting electrode 182 extends in a direction intersecting the direction in which the common electrodes 154 extend (see FIG. 3). In other words, each touch-detecting electrode 182 intersects with the common electrodes 154. Therefore, in the case where the common electrodes 154 are arranged parallel to the gate-signal lines 120 as shown in FIG. 3, the touch-detecting electrode 182 intersects not only the common electrodes 154 but also the gate-signal lines 120. Although not illustrated, the tough-detecting electrode 182 is arranged parallel to the gate-signal lines 120 (so as to intersect the image-signal lines 122) in the case where the common electrodes 154 are arranged perpendicularly to the gate-signal lines 120. A width of each touch-detecting electrode 182 is larger than a width of the pixel 104, and therefore, one touch-detecting electrode 182 overlaps with the plurality of pixels 104 arranged perpendicularly to the direction in which the touch-detecting electrode 182 extends (see FIG. 2). Each touch-detecting electrode 182 is disposed so as to cross over the display region 106. That is, a length of each touch-detecting electrode 182 is larger than a length of the display region 106 in the direction in which the touch-detecting electrode 182 extends, and both edge portions thereof do not overlap with the display region 106.

Ground electrodes 184 may be disposed as an optional structure over the counter substrate 180. The number of the ground electrodes 184 of the display device 100 may be one, or a pair of ground electrodes 184 may be disposed to sandwich the plurality of touch-detecting electrodes 182. The ground electrodes 184 may overlap or may not overlap with the display region 106. Alternatively, the ground electrodes 184 may be arranged so that an edge thereof and an edge of the display region 106 overlap with each other in a vertical direction (a normal direction of a main surface of the array substrate 102 or the counter substrate 180) and are parallel to each other. It is possible to shield an electric field leaked from peripheral circuits by providing the ground electrodes 184.

An electrically floating electrode 186 may be further disposed between the adjacent touch-detecting electrodes 182 or between the touch-detecting electrode 182 and the ground electrode 184 over the counter substrate 180. The plurality of touch-detecting electrodes 182, the ground electrode 184, and the floating electrode 186 are arranged so as to be electrically independent from one another. The formation of the floating electrode 186 makes the refractive index of the display region 106 entirely uniform, by which unevenness caused by the touch-detecting electrodes 182 becomes inconspicuous and a display without distortion can be realized. Note that, similar to the touch-detecting electrodes 182, the ground electrode 184 and the floating electrode 186 are longer than the display region 106 in the direction in which the touch-detecting electrodes 180 extend. The floating electrode 186 may be formed so as to cross over the display region 106, and both edge portions thereof do not overlap with the display region 106 in this case.

The image displayed in the display region 106 is observed through the touch-detecting electrodes 182, the floating electrode 186, and the ground electrode 184. Hence, these electrodes include a conductive oxide capable of transmitting visible light, such as ITO and IZO. Alternatively, these electrodes may include a metal such as aluminum, molybdenum, tantalum, and titanium. In this case, these electrodes are structured so as to have a plurality of openings or a mesh shape to allow visible light to pass therethrough.

3-2. Arrangement and Shape of Edge Portion of Electrode

Figure 6A:
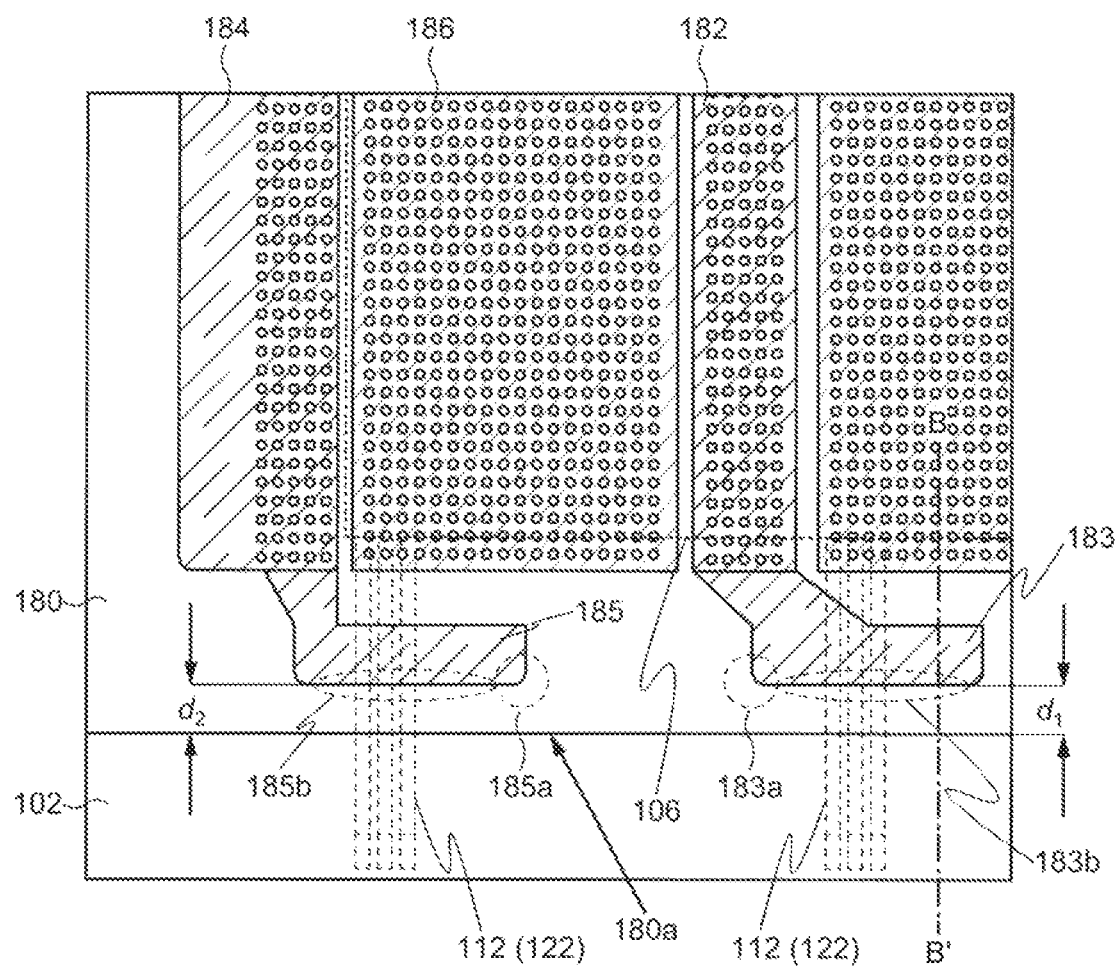
FIG. 6A to FIG. 6C are enlarged schematic top views of a counter substrate of a display device according to an embodiment of the present invention.
Figure 7:
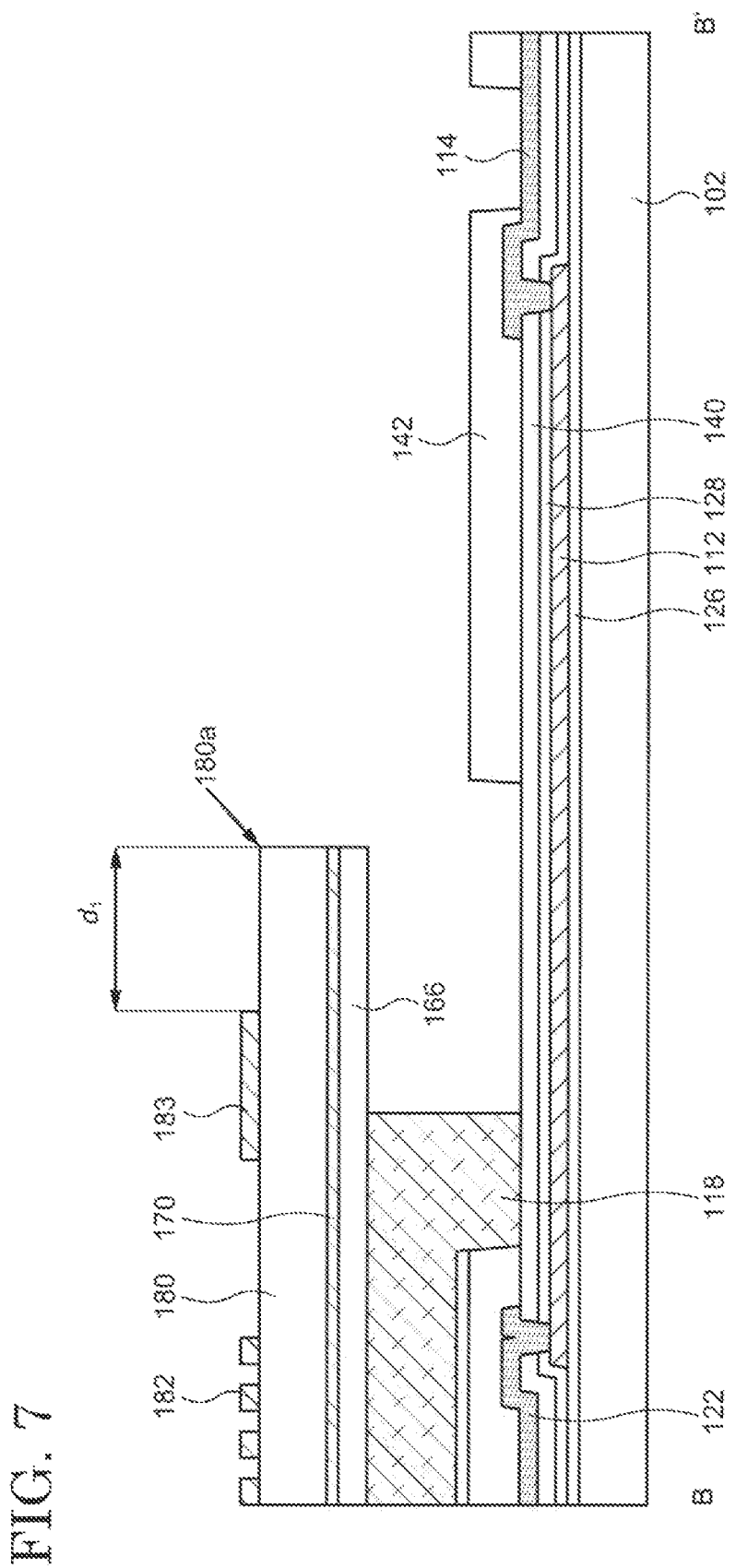
FIG. 7 is a schematic cross-sectional view of a display device according to an embodiment of the present invention.

An enlarged view of an edge portion of the counter substrate 180 on the terminal 114 side and its vicinity is shown in FIG. 6A, and a schematic view of a cross section along a dotted line B-B' in FIG. 6A is shown in FIG. 7. The array substrate 102 and a portion of the wirings 112 formed thereover are also illustrated in FIG. 6A. As shown in FIG. 7, the image-signal line 122 is electrically connected to the terminal 114 through the wiring 112. In the example depicted in FIG. 7, the wiring 112 is electrically connected to the image-signal line 122 and the terminal 114 which are arranged in a layer different from the wiring 112 through an opening formed in the gate insulating film 128 and the interlayer insulating film 140. However, the image-signal line 122 may be directly connected to the terminal 114 or may extend to the edge portion of the array substrate 102 and be exposed at the edge portion to form the terminal 114.

As demonstrated in FIG. 6A, a terminal portion 183 electrically connected to the touch-detecting electrode 182 is formed for the touch-detecting electrode 182. The terminal portion 183 may be a single film integrated with the touch-detecting electrode 182, or the terminal portion 183 and the touch-detecting electrode 182 may be independent films. In the latter case, the terminal portion 183 and the touch-detecting electrode 182 are arranged so that the parts thereof overlap with each other. Although the terminal portion 183 may include a conductive oxide such as ITO and IZO, it may be a metal film which does not have an opening or a mesh structure because it does not overlap with the display region 106. The terminal portion 183 overlaps with the plurality of wirings 112 and a sealing material 118 and is configured to be electrically connected to a connector 188 such as an FPC (see FIG. 5). With this structure, a potential variation of the touch-detecting electrode 182 can be detected with an external circuit (not illustrated) through the terminal portion 183.

A capacitance is formed between the common electrode 154 and the touch-detecting electrode 182. When an alternating voltage (pulse voltage) is applied to the common electrode 154 in a period during which no image is displayed, the potential of the touch-detecting electrode 182 fluctuates due to the capacitance coupling. It is possible to determine whether there is a touch or not at a coordinate over the display region 106 by detecting the magnitude of this fluctuation. Specifically, when a user directly or indirectly touches the display region 106 through the touch-detecting electrode 182 (hereinafter, this operation is referred to as a touch), a capacitance is newly added between the touch-detection electrode 182 and the user. As a result, the coupling between the common electrode 154 and the touch-detecting electrode 182 is partly inhibited, and the amplitude of the potential of the touch-detecting electrode 182 is reduced. The touch by the user can be recognized and the position of the touch can be specified by detecting the decrease of the amplitude. Hence, the display device 100 also has a function as an electrostatic capacitive type (projective electrostatic capacitive type) in-cell mode touch sensor.

Here, the terminal portion 183 may be provided so as to be spaced away from the edge portion of the counter substrate 180 as shown in FIG. 6A and FIG. 7. More specifically, the terminal portion 183 may be provided so as to be spaced away from an edge 180a of the counter substrate 180 intersecting the wiring 112 or the image-signal line 122 functioning as the wiring 112. In this case, a distance $d_1$ between the terminal portion 183 and the edge 180a (i.e., a distance between a point of the terminal portion 183 closest to the edge 180a and the edge 180a) is preferred to be equal to or longer than 200 µm and equal to or shorter than 1000 µm, equal to or longer than 300 µm and equal to or shorter than 800 µm, or equal to or longer than 400 µm and equal to or shorter than 600 µm.

Figure 6B:
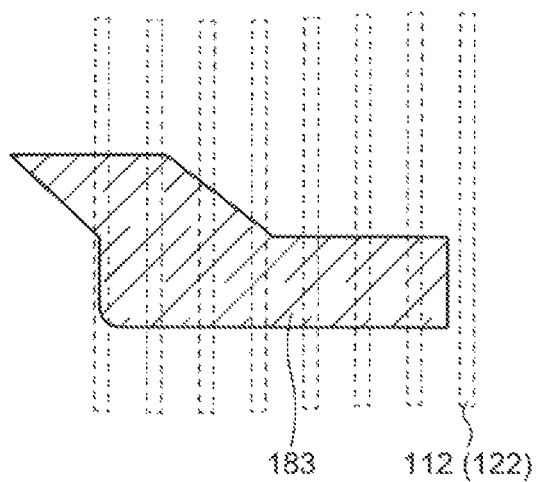

Alternatively, the terminal portion 183 may be formed so that a corner on the edge 180a side is structured with a curve. Specifically, the terminal portion 183 may be formed so that at least a part of a plane shape (a shape in a plane parallel to the main surface of the counter substrate 180) has a curved portion 183a facing the edge 180a (FIG. 6A and FIG. 6B). It is preferred that a curvature radius of the curved portion 183a be equal to or larger than 50 µm and equal to or smaller than 200 µm or equal to or larger than 50 µm and equal to or smaller than 100 µm. The plane shape of the terminal portion 183 may be composed of a single curved portion 183a on the edge 180a side. Alternatively, the at least one curved portion 183a may include a plurality of curved portions 183a. Moreover, the plane shape of the terminal portion 183 may have a linear portion 183b parallel to the edge 180a on the edge 180a side. In this case, the linear portion 183b is arranged to be sandwiched by the plurality of curved portions 183a. For example, the plane shape of the terminal portion 183 may have the linear portion 183b which is spaced away from the edge 180a by the distance $d_1$ and which is parallel to the edge 180a as well as a pair of curved portions 183a sandwiching the linear portion 183b as shown in FIG. 6A. Note that, when the wiring 112 or the image-signal line 122 does not overlap with the corner of the terminal portion 183 as shown in FIG. 6B, the terminal portion 183 may be formed so that the terminal portion 183 has a corner composed of two linear lines without providing the curved portion 183a at the corner of the terminal portion 183.

Similar to the touch-detecting electrode 182, when the ground electrode 184 is provided, a terminal portion 185 electrically connected to the ground electrode 184 may be formed for the ground electrode 184. The terminal portion 185 may be a single film integrated with the ground electrode 184, or the terminal portion 185 and the ground electrode 184 are films independent from each other. In the latter case, the terminal portion 185 and the ground electrode 184 are arranged so that a part of each overlaps with each other. The terminal portion 185 may also include a conductive oxide such as ITO and IZO or may be a metal film which does not have an opening or a mesh structure. The terminal portion 185 also overlaps with the wiring 112 and the sealing material 118 and is configured to be electrically connected to the connector 188. A ground potential is supplied to the ground electrode 184 from an external circuit (not illustrated) through the terminal portion 185.

As shown in FIG. 6A, the terminal portion 185 may be also arranged so as to be spaced away from the edge portion of the counter substrate 180, that is, the edge 180a. A distance between the terminal portion 185 and the edge 180a (i.e., a distance between a point of the terminal portion 185 closest to the edge 180a and the edge 180a) is also preferred to be equal to or larger than 200 µm and equal to or smaller than 1000 µm, equal to or larger than 300 µm and equal to or smaller than 800 µm, or equal to or larger than 400 µm and equal to or smaller than 600 µm. The distances $d_1$ and $d_2$ may be the same as or different from each other.

Figure 6C:
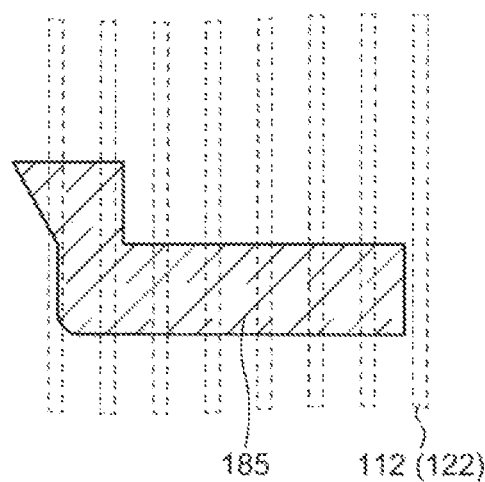

Alternatively, similar to the terminal portion 183, the terminal portion 185 may be formed so that a corner on the edge 180a side is rounded. Specifically, a part of a plane shape of the terminal portion 185 may have a curved portion 185a facing the edge 180a, and a curvature radius thereof is preferred to be equal to or larger than 50 µm and equal to or smaller than 200 µm or equal to or larger than 50 µm and equal to or smaller than 100 µm. The curvature radius of the terminal portion 183 and the curvature radius of the terminal portion 185 may be the same as or different from each other. The at least one curved portion 185a may also include a plurality of curved portions 185a. Furthermore, the plane shape of the terminal portion 185 may have a linear portion 185a parallel to the edge 180a on the edge 180a side. In this case, the linear portion 185b is arranged so as to be sandwiched by the plurality of curved portions 185a. For example, the plane shape of the terminal portion 185 may have the linear portion 185b which is spaced away from the edge 180a by the distance $d_2$ and is parallel to the edge 180a as well as a pair of curved portions 185a sandwiching this linear portion 185b as shown in FIG. 6A. Similar to the terminal portion 183, in the case where the wiring 112 or the image-signal line 122 does not overlap with the corner of the terminal portion 185 as demonstrated in FIG. 6C, the terminal portion 185 may be formed so that the terminal portion 185 has a corner composed of two linear lines without providing the curved portion 185a at the corner of the terminal portion 185.

Figure 8:
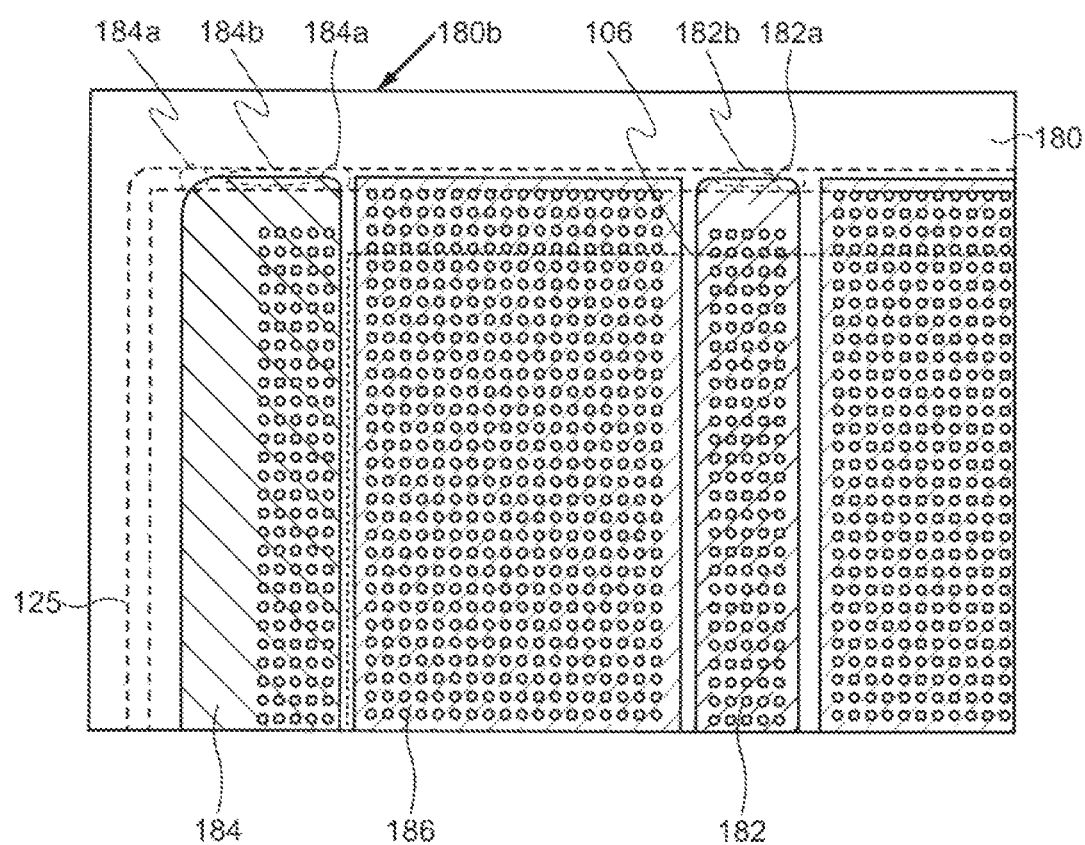
FIG. 8 is an enlarged schematic top view of a counter substrate of a display device according to an embodiment of the present invention.

Edge portions of these electrodes on an opposite side with respect to the terminal portions 183 and 185 may also each have a curved portion. For example, at least a part of a plane shape of the edge portion of the touch-detecting electrode 182 on the opposite side to the terminal portion 183 may have a curved portion 182e facing an edge 180b opposing the edge 180a as shown in a schematic top view (FIG. 8). Alternatively, the plane shape of this edge portion may be composed of a single curved portion 182a on the edge 180b side. The curvature radius of the curved portion 182a is also preferred to be equal to or larger than 50 μm and equal to or smaller than 200 μm or equal to or larger than 50 μm and equal to or smaller than 100 μm and may be the same as or different from the curvature radius of the curved portion 183a of the terminal portion 183. Alternatively, the plane shape of this edge portion may include a plurality of curved portions on the edge 180b side. More specifically, the plane shape of the edge portion may have a linear portion 182b parallel to the edge 180b on the edge 180b side. In this case, the linear portion 182b is arranged so as to be sandwiched by the plurality of curved portions 182a. For example, the plane shape of the edge portion may have the linear portion 182b parallel to the edge 180b as well as a pair of curved portions 182a sandwiching the linear portion 182b as shown in FIG. 7.

The same is applied to the ground electrode 184, and at least a part of a plane shape of an edge portion of the ground electrode 184 opposite to the terminal portion 185 may have a curved portion 184a facing the edge 180b (FIG. 8). Alternatively, the plane shape of this edge portion may be composed of a single curved portion 184a on the edge 180b side. The curvature radius of the curved portion 184a is also preferred to be equal to or larger than 50 μm and equal to or smaller than 200 μm or equal to or larger than 50 μm and equal to or smaller than 100 μm and may be the same as or different from the curved radius of the curved portion 185a of the terminal portion 185. Alternatively, the at least one curved portion 184a may include a plurality of curved portions 184a. Furthermore, the plane shape of the edge portion may have a linear portion 184b parallel to the edge 180b on the edge 180b side. In this case, the linear portion 184b is arranged so as to be sandwiched by the plurality of curved portions 184a. For example, the plane shape of the edge portion may have the linear portion 184b parallel to the edge 180b as well as a pair of curved portions 184a sandwiching this linear portion 184b as shown in FIG. 8.

Figure 9:
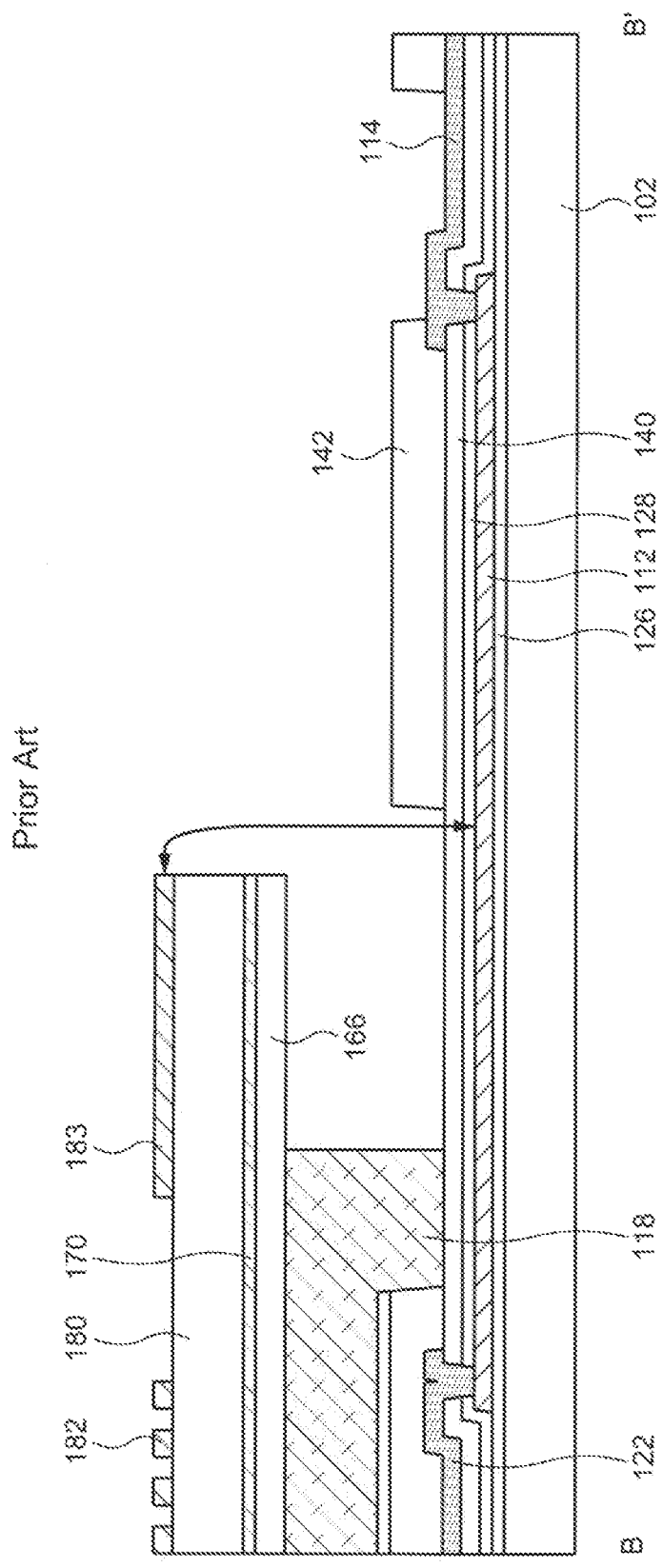
FIG. 9 is a schematic cross-sectional view of a display device according to prior art.

The terminal portion 183 of the touch-detecting electrode 182 and the terminal portion 185 of the ground electrode 184 are spaced away from the edge 180a, or the corners of the terminal portion 183 of the touch-detecting electrode 182, the edge portion opposite thereto, the terminal portion 183 of the ground electrode 184, and the edge portion opposite thereto are structured by a curve as described above, by which an electrostatic breakdown during the production of the display device 100 and the like can be effectively suppressed. Specifically, the display device 100 may be charged during a bonding process of the counter substrate 180 to the array substrate 102 or the like, which may cause a large potential different between the touch-detecting electrode 182 and the wiring 112 or between the ground electrode 184 and the wiring 112. When the terminal portion 183 of the touch-detecting electrode 182 or the terminal portion 183 of the ground electrode 184 matches the edge 180a or when the distance from the edge 180a is small (e.g., shorter than 200 μm), discharge may occur between these electrodes (terminal portions of the electrodes) and the wiring due to this potential difference (FIG. 9). As a result, the touch-detecting electrode 182, the ground electrode 184, or the wiring 112 is damaged (electrostatic breakdown). Particularly, when the corner of the plane shape of the terminal portion 183 or 185 has an acute angle of 90° or less, such a short-circuit pass is readily formed. Although it has been traditionally known that an electrostatic breakdown occurs between extremely close wirings, e.g., between the adjacent wirings 112 in the same layer, the electrostatic breakdown caused by the discharge between the wirings or electrodes formed over different substrates is a previously unknown new problem resulting from the recent demand to thin the display device itself.

In the display device 100, however, the terminal portions 183 and 185 are spaced away from the closest edge 180a of the counter substrate 180 by the distance $d_1$ or $d_2$. Alternatively, the terminal portions 183 and 185 are formed so that the plane shapes thereof do not have an angular corner, but the corners are formed with the curved portions. Thus, the discharge between the terminal portion 183 and the discharge between the wiring 112 and between the terminal portion 185 and the wiring 112 are prevented, thereby suppressing failure occurrence caused by the electrostatic breakdown.

The wiring over the array substrate 102 which may undergo the electrostatic breakdown is not limited to the wiring 112 and the image-signal line 122. For example, discharge may occur due to a potential difference between the wiring 125 provided for the purpose of supplying a potential to the common electrode 154 or to connect the gate-line driver circuits 108 (see FIG. 8) and the ground electrode 184 or between the wiring 125 and the touch-detecting electrode 182, leading to the breakdown of the wiring 125. Particularly, discharge readily occurs in the portion where the wiring 125 overlaps with the ground electrode 184 or the touch-detecting electrode 182 as shown in FIG. 8. However, the curved portions 182a and 184a are respectively provided to the corner of the edge portion opposite to the terminal portion 183 of the touch-detecting electrode 182 and to the corner of the edge portion opposite to the terminal portion 185 of the ground electrode 184, by which the discharge is prevented and damage of the wiring 125 due to the electrostatic breakdown can be effectively avoided. Hence, implementation of an embodiment of the present embodiment allows the production of the display device at a high yield, which contributes to the reduction of the manufacturing cost.

4. Modified Example 1

The structure of the touch-detecting electrode 182 formed over the counter substrate 180 is not limited to the structure described above. Hereinafter, two Modified Examples are explained. An explanation of the structures the same as or similar to those of the aforementioned display device 100 may be omitted.

Figure 10:
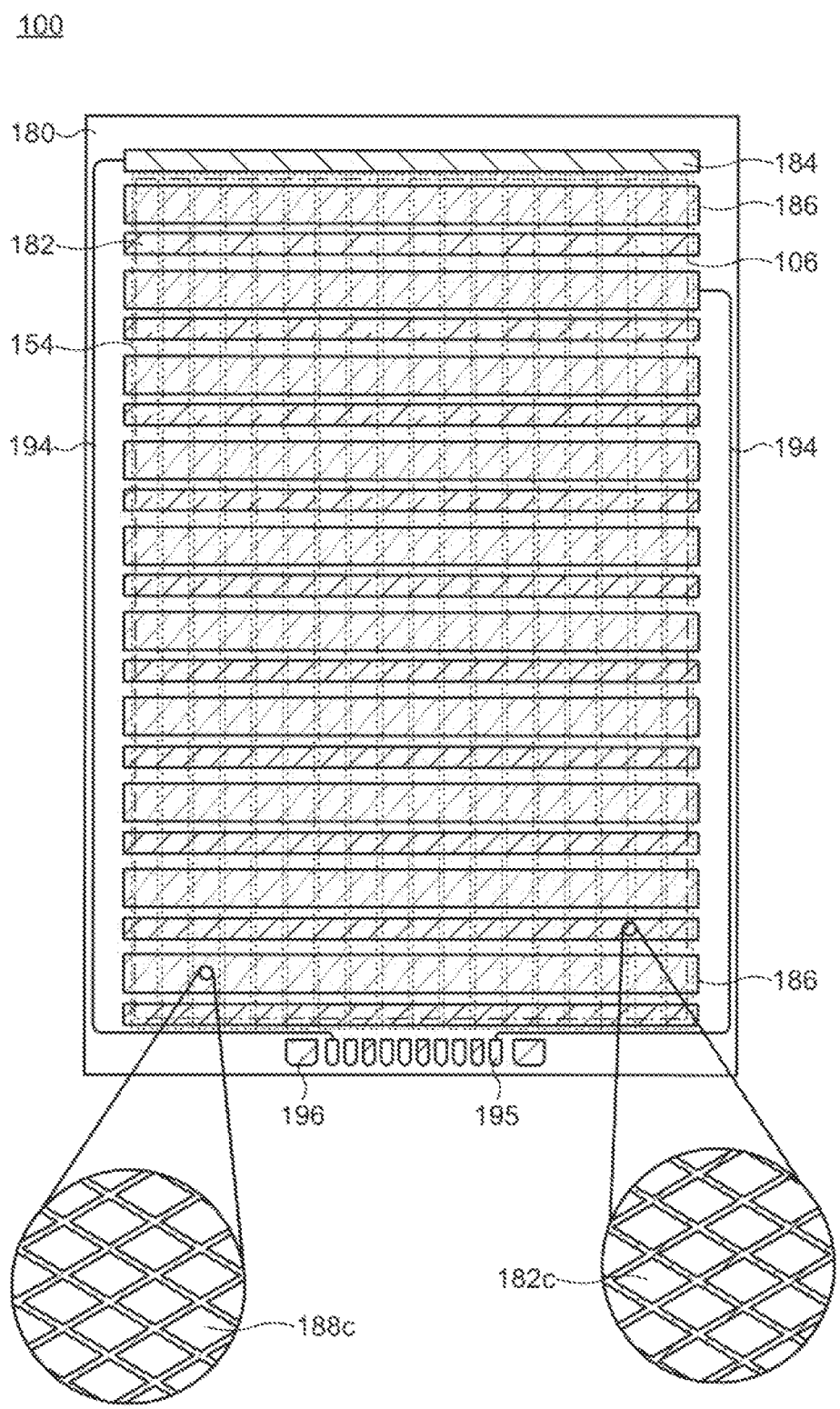
FIG. 10 is a schematic top view of a counter substrate of a display device according to an embodiment of the present invention.

As shown in FIG. 10, for example, the display device 100 may include a plurality of touch-detecting electrodes 182 arranged in a stripe form over the counter substrate 180 and lead wirings 194 electrically connected to the respective touch-detecting electrodes 182. Since the touch-detecting electrodes 182 are arranged parallel to a short edge of the counter substrate 180 in the example shown in FIG. 10, the common electrodes 154 are arranged parallel to the long edge of the counter substrate 180, i.e., parallel to the image-signal lines 122. Although not illustrated, the common electrodes 154 and the touch-detecting electrodes 182 may be arranged so as to be parallel to the short edge and the long edge of the counter substrate 180, respectively.

Each lead wiring 194 extends in the region (frame region) surrounding the display region 106 and is exposed at a vicinity of the edge 180a of the counter substrate 180 to form a terminal portion 195. One touch-detecting electrode 182 and the lead wiring 194 connected thereto may be integrated or may be formed with films independent from each other. It is preferred that the lead wirings 194 include aluminum, titanium, tungsten, molybdenum, or an alloy including these metals in order to prevent a voltage drop in the lead wirings 194. When the touch-detecting electrode 182 and the lead wiring 194 are integrated, it is preferred that each touch-detecting electrode 182 be formed to have a mesh shape with a plurality of openings 182c in order not to block the display provided by the display region 106 (FIG. 10). With this structure, the voltage drop in the touch-detecting electrode 182 can also be suppressed, which enables accurate touch detection. Each touch-detecting electrode 182 may be formed with a light-transmitting conductive oxide. In this case, it is preferred that the lead wirings 194 be prepared using a metal. Note that, although not illustrated, the lead wirings 194 may be configured so that a part thereof has a mesh shape.

As described above, the ground electrode 184 and the floating electrode 186 may be provided as an optional structure. It is also preferred that the ground electrode 184 and the floating electrode 186 include a metal and be formed so as to have a mesh shape including a plurality of openings 188c. These electrodes are also arranged parallel to the touch-detecting electrodes 182. The ground electrode 184 is also connected to the lead wiring 194, and terminal portion 195 is also provided to the lead wiring 194. In addition, a dummy electrode 196 may be provided as an optional structure. The dummy electrode 196 may exist in the same layer as the touch-detecting electrode 182, the lead wiring 194, the ground electrode 184, and the floating electrode 186. The properties of these electrodes such as conductivity can be evaluated using the dummy electrode 196. Moreover, it is also possible to provide a role as an electric-field shield for blocking an electric field leaking from peripheral circuits.

Figure 11:
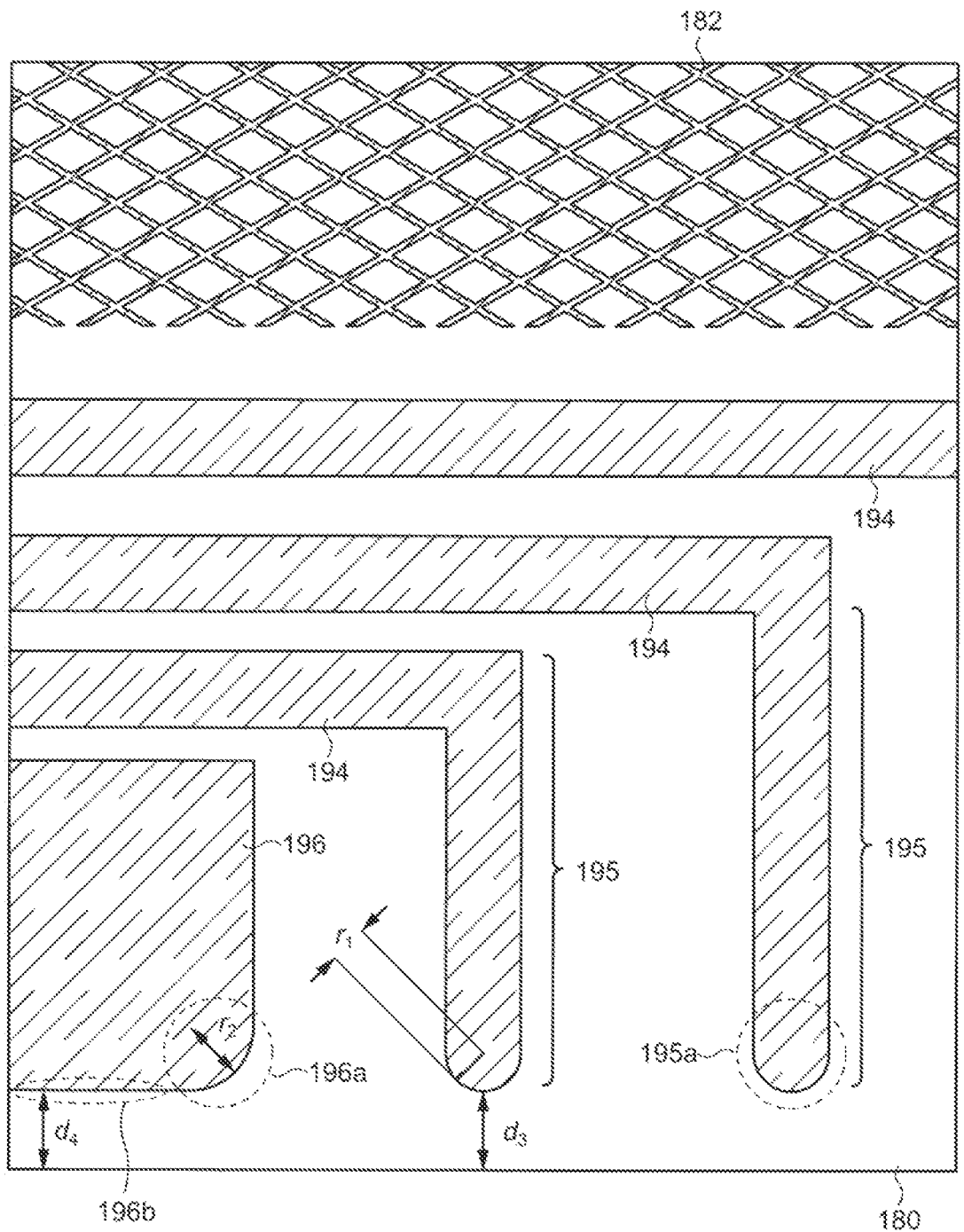
FIG. 11 is an enlarged schematic top view of a counter substrate of a display device according to an embodiment of the present invention.

As shown in an enlarged schematic top view of FIG. 11, the terminal portions 195 of the lead wirings 194 connected to the touch-detecting electrodes 182 and the ground electrodes 184 may be formed so as to be spaced away from the edge portion of the counter substrate 180. More specifically, the terminal portions 195 may be prepared so as to be spaced away from the edge 180a of the counter substrate 180 intersecting with the wiring 112 or the image-signal line 122 functioning as the wiring 112. A distance $d_3$ between the terminal portion 195 and the edge 180a (a distance from a point of the terminal portion 195 closest to the edge 180a to the edge 180a) is preferred to be equal to or longer than 200 μm and equal to or shorter than 1000 μm, equal to or longer than 300 μm and equal to or shorter than 800 μm, or equal to or longer than 400 μm and equal to or shorter than 600 μm.

Alternatively, the terminal portion 195 may be formed so that an edge portion on the edge 180a side has a curve. Specifically, the terminal portion 195 may be structured so that at least a part of the plane shape of the terminal portion 195 has a curved portion 195a facing the edge 180a. The curvature radius $r_1$ of the curved portion 195a is preferred to be equal to or larger than 50 μm and equal to or smaller than 200 μm or equal to or larger than 50 μm and equal to or smaller than 100 μm. The plane shape of the terminal portion 195 may be composed of a single curved portion 195a on the edge 180a side. In this case, the curvature radius $r_1$ is ½ of a width of the terminal portion 195.

As demonstrated in FIG. 11, the dummy electrode 196 may also be arranged so as to be spaced away from the edge portion of the counter substrate 180, i.e., the edge 180a. A distance $d_4$ between the dummy electrode 196 and the edge 180a (a distance from a point of the dummy electrode 196 closest to the edge 180a to the edge 180a) is also preferred to be equal to or larger than 200 μm and equal to or smaller than 1000 μm, equal to or larger than 300 μm and equal to or smaller than 800 μm, or equal to or larger than 400 μm and equal to or smaller than 600 μm. The distances $d_3$ and $d_4$ may be the same as or different from each other.

Similar to the terminal portion 195, the dummy electrode 196 may be also formed so that a corner on the edge 180a side is rounded. Specifically, at least a part of the plane shape of the dummy electrode 196 may have a curved portion 196a facing the edge 180a, and the curvature radius $r_2$ thereof is preferred to be equal to or larger than 50 μm and equal to or smaller than 200 μm or equal to or larger than 50 μm and equal to or smaller than 100 μm. The curvature radius $r_1$ and the curved radius $r_2$ may be the same as or different from each other. The at least one curved portion 196a may include a plurality of curved portions. In addition, the edge 180a side of the plane shape of the dummy electrode 196 may have a linear portion 196b parallel to the edge 180a. In this case, the linear portion 196b is arranged so as to be sandwiched by the plurality of curved portions 196a. For example, the plane shape of the dummy electrode 196 may have the linear portion 196b spaced away from the edge 180a by the distance $d_4$ and parallel to the edge 180a as well as a pair of curved portions 196a sandwiching this linear portion 196b. The distances $d_3$ and $d_4$ may be also the same as or different from each other.

The formation of the terminal portion 195 and the dummy electrode 196 having the aforementioned shapes and arrangements efficiently prevents the electrostatic breakdown caused by the discharge between the touch-detecting electrode 182 and the wiring 112, between the touch-detecting electrode 182 and the wiring 125, or between the ground electrode 184 and the wiring 125, which enables production of the display device 100 at a high yield.

5. Modified Example 2

Figure 12:
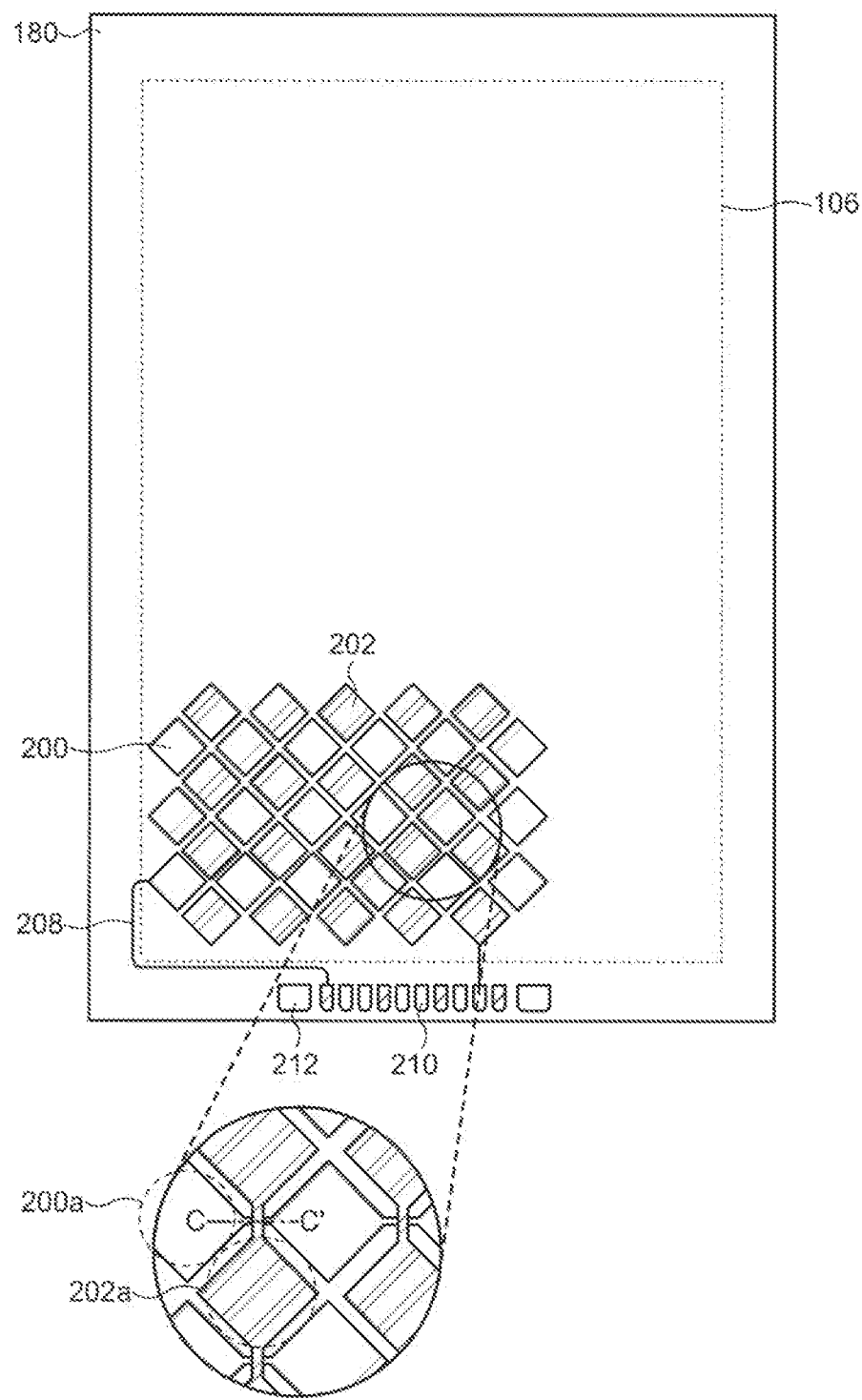
FIG. 12 is a schematic top view of a counter substrate of a display device according to an embodiment of the present invention.

In the Embodiment described above, the touch sensor is an in-cell type touch sensor structured by the common electrodes 154 and the touch-detecting electrodes 182. However, the touch sensor of the display device 100 according to an embodiment of the present invention is not limited to an in-cell type touch sensor. For instance, the display device 100 may include a plurality of first touch electrodes 200 arranged parallel to each other and a plurality of second touch electrodes 202 intersecting with the plurality of first touch electrodes 200 over the counter substrate 180 as shown in FIG. 12. Each first touch electrode 200 has a plurality of touch regions 202a, and the adjacent touch regions 200a are electrically connected to each other. Similarly, the second touch electrodes 202 also each have a plurality of touch regions 202a, and the adjacent touch regions 202a are electrically connected to each other. The touch regions 200a and 202a do not overlap with each other, and a connection portion of two adjacent touch regions 200a and a connection portion of two adjacent touch regions 202a intersect with each other. The first touch electrodes 200 and the second touch electrodes 202 may be configured to include a light-transmitting conductive oxide or may be structured with a metal film having a mesh shape with a plurality of openings.

Figure 13:
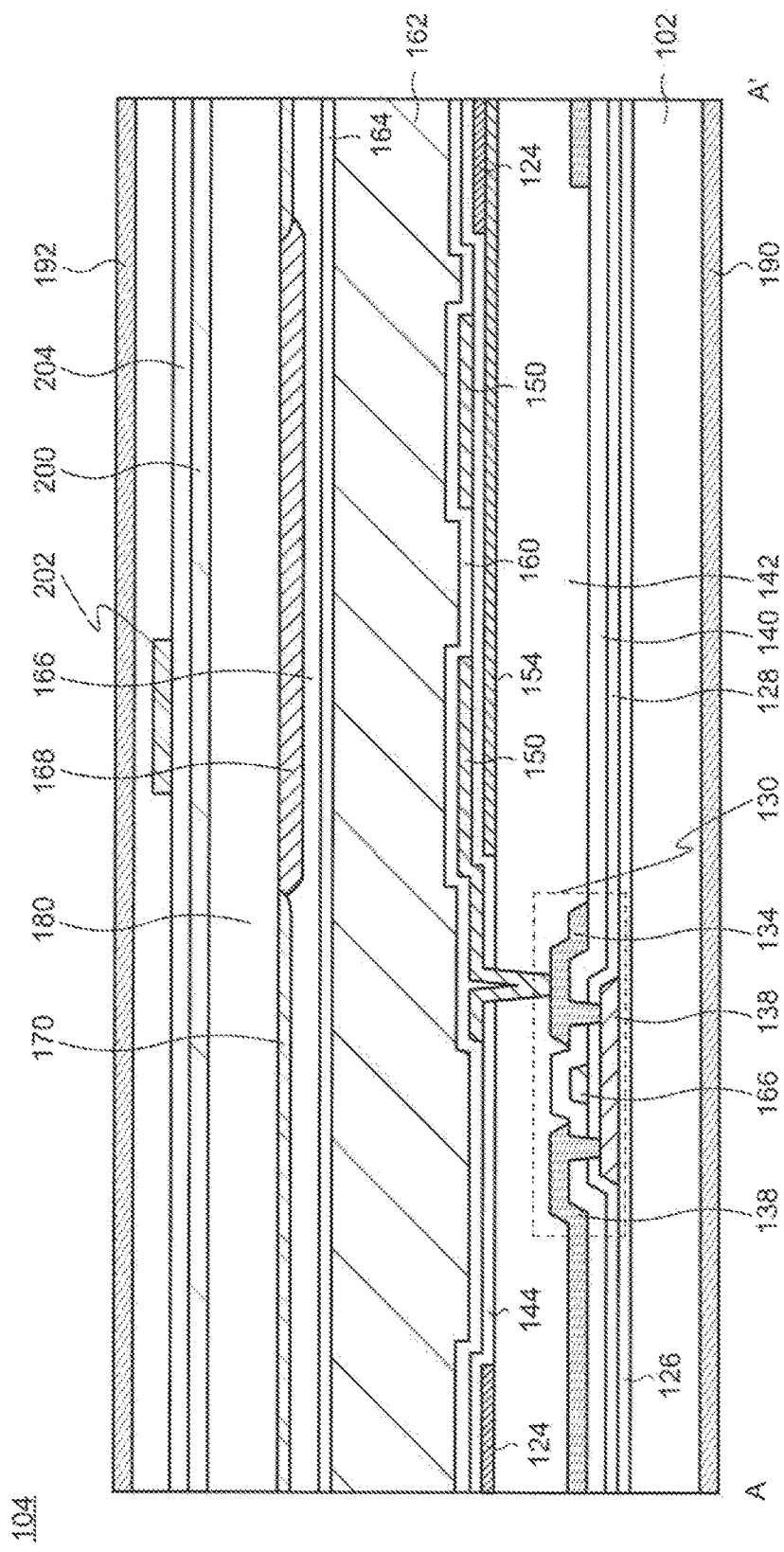
FIG. 13 is a schematic cross-sectional view of a display device according to an embodiment of the present invention.

A schematic view of a cross section along a dotted line C-C' in FIG. 12 is shown in FIG. 13. As shown in FIG. 13, the first touch electrode 200 is disposed over the counter substrate 180 directly or through an insulating film or the like which is not illustrated. An insulating film 204 is provided over the first touch electrode 200, and the second touch electrode 202 is arranged over the insulating film 204. A capacitance is formed between the first touch electrode 200 and the second touch electrode 202 through the insulating film 204. When an alternating current is applied to one of the first touch electrode 200 and the second touch electrode 202, the potential of the other touch electrode fluctuates by capacitive coupling. It is possible to detect whether there is a touch or not at a coordinate on the display region 106 by detecting this fluctuation. Hence, the display device 100 according to this Modified Example 2 also functions as an electrostatic capacitive type (projective electrostatic capacitive type) on-cell mode touch panel. Therefore, it is not necessary to apply an alternating current to the common electrodes 154 in a non-display period.

Although not illustrated, the first touch electrodes 200, the second touch electrodes 202 and the insulating film 204 may not be formed over the counter substrate 180 but may be formed over a light-transmitting substrate such as glass or plastic to fabricate a touch panel. In this case, the touch panel may be bonded on the counter substrate 180 so that the first touch electrodes 200, the second touch electrodes 202, and the insulating film 204 are sandwiched by the light-transmitting substrate and the counter substrate 180.

Figure 14A:
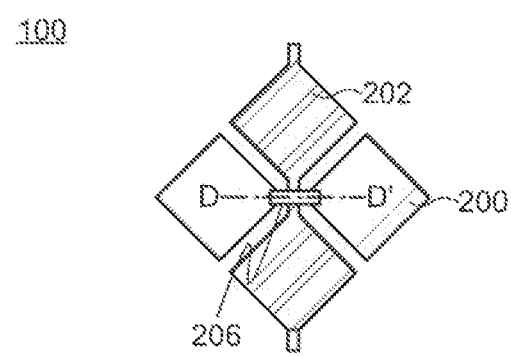
FIG. 14A and FIG. 14B are respectively an enlarged schematic top view and a schematic cross-sectional view of a counter substrate of a display device according to an embodiment of the present invention.
Figure 14B:
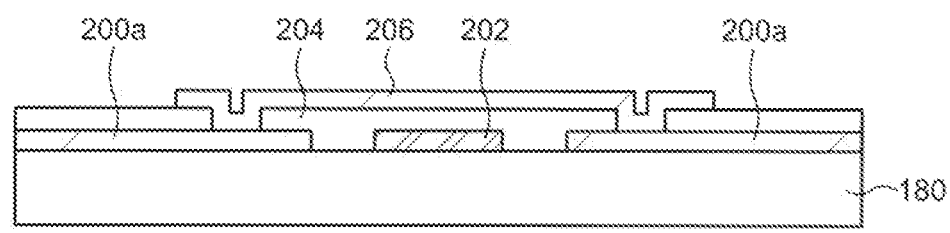

There is no limitation to the vertical relationship between the first touch electrodes 200 and the second touch electrodes 202, and the first touch electrodes 200 may be formed over the second touch electrodes 202 through the insulating film 204. Alternatively, the display device 100 may be configured so that the plurality of first touch electrodes 200 and the plurality of second touch electrodes 202 exist in the same layer. In this case, a bridge wiring 206 is provided between the adjacent touch regions 200a or between the adjacent touch regions 202a as shown in a schematic top view (FIG. 14A) of a portion of the display device 100. As depicted in a schematic view (FIG. 14B) of a cross section along a dotted line D-D' in FIG. 14A, the bridge wiring 206 is electrically connected to the adjacent two touch regions 200a or 202a through an opening formed in the insulating film 204.

Similar to the Modified Example 1, lead wirings 208 extending in the frame region are respectively connected to the first touch electrodes 200 and the second touch electrodes 202 and are exposed at a vicinity of the edge 180a of the counter substrate 180 to form terminal portions 210 as shown in FIG. 12. The first touch electrode 200 and the lead wiring 208 connected thereto may be integrated or may be structured with films independent from each other. Similarly, the second touch electrode 202 and the lead wiring 208 connected to thereto may be integrated or may be structured with films independent from each other.

As an optional structure, the display device 100 according to this Modified Example may also include a dummy electrode 212. An explanation is omitted because the shapes and the arrangements of the terminal portions 210 and the dummy electrode 212 are the same as those of the terminal portions 195 and the dummy electrode 196 of the Modified Example 1. Thus, it is also possible to efficiently prevent electrostatic breakdown caused by the discharge between the first touch electrode 200 and the wiring 112 or between the second touch electrode 202 and the wiring 112 and to produce the display device 100 at a high yield in this Modified Example 2.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

In the specification, although the display device having a liquid crystal element is exemplified as a disclosed example, the embodiments can be applied to any kind of display devices of the flat panel type such as other self-emission type display devices, liquid crystal display devices, and electronic paper type display device having electrophoretic elements and the like.

It is understood that another effect different from that provided by each of the aforementioned embodiments is achieved by the present invention if the effect is obvious from the description in the specification or readily conceived by persons ordinarily skilled in the art.

What is claimed is:

1. A display device comprising:
an array substrate;
a pixel overlapping the array substrate and including a pixel electrode, a common electrode, and a liquid crystal layer;
an image-signal line overlapping the array substrate and electrically connected to the pixel;
a counter substrate over the pixel and the image-signal line;
to a touch-detecting electrode overlapping the counter substrate and extending in a direction intersecting a direction in which the common electrode extends; and
a first terminal portion electrically connected to the touch-detecting electrode,
wherein the first terminal portion is internally spaced away from a first edge of the counter substrate, the first edge intersecting the image-signal line, and
a plane shape of the first terminal portion in a plane parallel to a main surface of the counter substrate has at least one first curved portion facing the first edge.

2. The display device according to claim 1,
wherein the plane shape further has a first linear portion parallel to the first edge,
the at least one curved portion includes a plurality of first curved portions, and
the first linear portion is sandwiched by the plurality of first curved portions.

3. The display device according to claim 1,
wherein a shape of a terminal portion of the touch-detecting electrode opposite to the first terminal portion in the plane has at least one second curved portion facing a second edge opposing the first edge.

4. The display device according to claim 3,
wherein the shape of the terminal portion further has a second linear portion parallel to the second edge,
the at least one second curved portion includes a plurality of second curved portions, and
the second linear portion is sandwiched by the plurality of second curved portions.

5. The display device according to claim 3,
wherein a curvature radius of the at least one second curved portion is equal to or larger than 50 μm and equal to or smaller than 200 μm.

6. The display device according to claim 1,
wherein the first terminal portion overlaps with the image-signal line.

7. The display device according to claim 1,
wherein a curvature radius of the at least one first curved portion is equal to or larger than 50 μm and equal to or smaller than 200 μm.

8. The display device according to claim 1,
wherein a distance from a point of the first terminal portion closest to the first edge to the first edge is equal to or more than 200 μm and equal to or less than 1000 μm.

9. The display device according to claim 1,
wherein the liquid crystal layer is located over the pixel electrode and the common electrode.

10. The display device according to claim 1, further comprising:
a ground wiring overlapping the counter substrate and extending parallel to the touch-detecting electrode; and
a second terminal portion electrically connected to the ground wiring and configured to be supplied with a ground potential,
wherein the second terminal portion is internally spaced away from the first edge, and
a plane shape of the second terminal portion in the plane has at least one third curved portion facing the first edge.

11. The display device according to claim 10,
wherein the plane shape of the second terminal portion further has a third linear portion parallel to the first edge,
the at least one third curved portion includes a plurality of third curved portions, and
the third linear portion is sandwiched by the plurality of third curved portions.

12. The display device according to claim 10,
wherein a shape of a terminal portion of the ground wiring opposite to the second terminal portion in the plane has at least one fourth curved portion facing a second edge opposing the first edge.

13. The display device according to claim 12,
wherein the shape of the terminal portion further has a fourth linear portion parallel to the second edge,
the at least one fourth curved portion includes a plurality of fourth curved portions, and
the fourth linear portion is sandwiched by the plurality of fourth curved portions.

14. The display device according to claim 1, further comprising a lead wiring connecting the touch-detecting electrode to the first terminal portion.

15. A display device comprising:
an array substrate;
a pixel overlapping the array substrate and comprising a pixel electrode and a common electrode;
an image-signal line overlapping the array substrate and electrically connected to the pixel;
a resin layer over the pixel and the image-signal line;
a first touch-detecting electrode overlapping the resin layer;
a second touch-detecting electrode overlapping the resin layer and intersecting the first touch-detecting electrode; and
a lead wiring having a first terminal portion electrically connected to one of the first touch-detecting electrode and the second touch-detecting electrode,
wherein the first terminal portion is internally spaced away from an edge of the resin layer intersecting the image-signal line, and
a plane shape of the first terminal portion in a plane parallel to a main surface of the resin layer has at least one first curved portion.

16. The display device according to claim 15,
wherein a curvature radius of the at least one first curved portion is equal to or larger than 50 μm and equal to or smaller than 200 μm.

17. The display device according to claim 15,
wherein a distance from a point of the first terminal portion closest to the edge is equal to or more than 200 μm and equal to or less than 1000 μm.

* * * * *